US011272502B2

(12) United States Patent
Choi et al.

(10) Patent No.: US 11,272,502 B2
(45) Date of Patent: Mar. 8, 2022

(54) METHOD FOR CONFIGURING SIDELINK RESOURCE IN COMMUNICATION SYSTEM AND APPARATUS FOR THE SAME

(71) Applicants: Hyundai Motor Company, Seoul (KR); Kia Motors Corporation, Seoul (KR); Industry-Academic Cooperation Foundation, Dankook University, Gyeonggi-do (KR)

(72) Inventors: Su Han Choi, Gyeonggi-do (KR); Gene Beck Hahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/533,281

(22) Filed: Aug. 6, 2019

(65) Prior Publication Data

US 2020/0045697 A1    Feb. 6, 2020

Related U.S. Application Data

(60) Provisional application No. 62/715,046, filed on Aug. 6, 2018.

(30) Foreign Application Priority Data

Jul. 22, 2019   (KR) .......................... 10-2019-0088078

(51) Int. Cl.
*H04W 72/04* (2009.01)
*H04L 5/14* (2006.01)

(52) U.S. Cl.
CPC ........... *H04W 72/0446* (2013.01); *H04L 5/14* (2013.01); *H04W 72/042* (2013.01)

(58) Field of Classification Search
CPC ................................................. H04W 72/0446
See application file for complete search history.

(56) References Cited

U.S. PATENT DOCUMENTS

| 2018/0219654 | A1  | 8/2018  | Chen et al. |
| 2019/0349904 | A1* | 11/2019 | Kwak ................ H04W 72/042 |
| 2019/0373647 | A1* | 12/2019 | Rugeland .............. H04W 76/10 |
| 2020/0092685 | A1* | 3/2020  | Fehrenbach ....... H04B 7/15507 |
| 2021/0058207 | A1* | 2/2021  | Lee ....................... H04L 5/0053 |

OTHER PUBLICATIONS

3GPP TS 38.331 V15.2.1 (Jun. 2018); 3rd Generation Partnership Project;Technical Specification Group Radio Access Network; NR; Radio Resource Control (RRC) protocol specification (Release 15); 303 pages.

* cited by examiner

*Primary Examiner* — Jason E Mattis
(74) *Attorney, Agent, or Firm* — Mintz Levin Cohn Ferris Glovsky and Popeo, P.C.; Peter F. Corless

(57) ABSTRACT

An operation method of a base station in a communication system is provided. The method includes generating TDD-uplink-downlink configuration common information including information regarding a DL-UL transmission period, a DL pattern indicating DL resources, a UL pattern indicating UL resources, and a SL pattern indicating SL resources and transmitting to a UE system information including the TDD-UL-DL-configuration common information. Therefore, the performance of the communication system is improved.

13 Claims, 10 Drawing Sheets

☐ : DL RESOURCE ▨ : SL RESOURCES ▦ : UL RESOURCES

☐ : DL RESOURCE ▨ : SL RESOURCES ▦ : UL RESOURCES

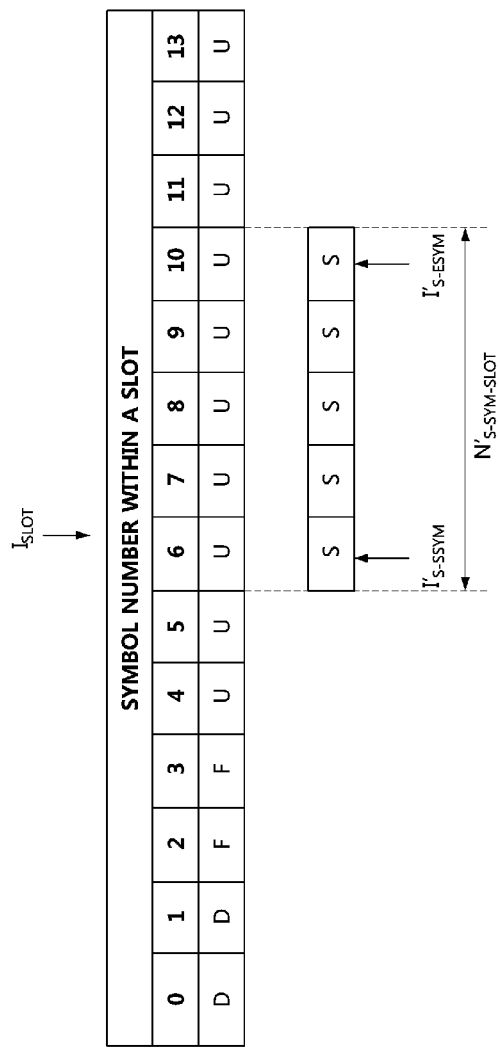

METHOD FOR CONFIGURING SIDELINK RESOURCE IN COMMUNICATION SYSTEM AND APPARATUS FOR THE SAME

CROSS-REFERENCE TO RELATED APPLICATIONS

This application claims the benefit of priorities to U.S. Provisional Patent Application No. 62/715,046, filed on Aug. 6, 2018 with the U.S. Patent and Trademark Office, and Korean Patent Application No. 10-2019-0088078, filed on Jul. 22, 2019 in the Korean Intellectual Property Office (KIPO), the entire contents of which are incorporated herein by reference.

BACKGROUND

1. Technical Field

The present disclosure relates generally to sidelink communication technology, and more specifically, to a technique for configuring sidelink resources.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

The sidelink communications may be performed using sidelink resources. However, a method of configuring the sidelink resources is not yet explicitly defined in the 3GPP LTE or NR specifications. Therefore, a method for configuring the sidelink resources is required to be defined.

SUMMARY

Accordingly, exemplary embodiments of the present disclosure provide an apparatus and a method for configuring sidelink resources.

According to the exemplary embodiments of the present disclosure, an operation method of a base station in a communication system may include generating time division duplex (TDD)-uplink-downlink configuration (TDD-UL-DL-configuration) common information, the TDD-UL-DL-configuration common information that includes information regarding a DL-UL transmission period, a DL pattern indicating DL resources, a UL pattern indicating UL resources, and a sidelink (SL) pattern indicating SL resources; and transmitting to a user equipment (UE) system information including the TDD-UL-DL-configuration common information, wherein the DL resources, the UL resources, and the SL resources are included in the DL-UL transmission period, and resources other than the DL resources, the UL resources, and the SL resources among all resources included in the DL-UL transmission period are flexible resources.

The SL pattern may include at least one of information that indicates a number of consecutive SL slots in the DL-UL transmission period, information that indicates a number of consecutive SL symbols located before a starting SL slot among the consecutive SL slots, information that indicates a number of consecutive SL symbols located after an ending SL slot among the consecutive SL slots, an index of the starting SL slot, and an index of the ending SL slot. The SL pattern may be used to reconfigure one or more UL resources among the UL resources configured by the UL pattern to SL resources used for SL communication.

The operation method may further include generating TDD-UL-DL-configuration dedicated information including a slot pattern that indicates resources used for SL communication among the flexible resources; and transmitting to the UE a radio resource control (RRC) message including the TDD-UL-DL-configuration dedicated information. The slot pattern may include at least one of a slot index, information indicating that all symbols included in a slot indicated by the slot index are SL symbols, information that indicates a number of consecutive SL symbols among all the symbols included in the slot indicated by the slot index, an index of a starting SL symbol among the consecutive SL symbols, and an index of an ending SL symbol among the consecutive SL symbols.

The operation method may further include generating a downlink control information (DCI) including a slot format indicator (SFI) indicating resources used for SL communication among the flexible resources; and transmitting the DCI to the UE through a physical downlink control channel (PDCCH).

Furthermore, according to the exemplary embodiments of the present disclosure, an operation method of a first user equipment (UE) in a communication system may include receiving from a base station system information including time division duplex (TDD)-uplink-downlink configuration (TDD-UL-DL-configuration) common information; and identifying information regarding a DL-UL transmission period, a DL pattern indicating DL resources, a UL pattern indicating UL resources, and a sidelink (SL) pattern indicating SL resources, which are included in the TDD-UL-DL-configuration common information. The DL resources, the UL resources, and the SL resources are included in the DL-UL transmission period, and resources other than the DL resources, the UL resources, and the SL resources among all resources included in the DL-UL transmission period are flexible resources.

The SL pattern may include at least one of information that indicates a number of consecutive SL slots in the DL-UL transmission period, information that indicates a number of consecutive SL symbols located before a starting SL slot among the consecutive SL slots, information that indicates a number of consecutive SL symbols located after an ending SL slot among the consecutive SL slots, an index of the starting SL slot, and an index of the ending SL slot. The SL pattern may be used to reconfigure one or more UL resources among the UL resources configured by the UL pattern to SL resources used for SL communication.

The operation method may further include receiving from the base station a radio resource control (RRC) message including TDD-UL-DL-configuration dedicated information; identifying from the TDD-UL-DL-configuration dedicated information a slot pattern indicating resources used for SL communication among the flexible resources; and performing DL communication, UL communication, or the SL communication using resources configured by the TDD-UL-DL-configuration common information and the TDD-UL-DL-configuration dedicated information.

The slot pattern may include at least one of a slot index, information that indicates that all symbols included in a slot indicated by the slot index are SL symbols, information that indicates a number of consecutive SL symbols among all the symbols included in the slot indicated by the slot index, an index of a starting SL symbol among the consecutive SL symbols, and an index of an ending SL symbol among the consecutive SL symbols.

The performing of the SL communication may further include transmitting to a second UE a sidelink control information (SCI) including information that indicates the SL resources configured by the TDD-UL-DL-configuration common information and the TDD-UL-DL-configuration dedicated information; and performing the SL communication with the second UE using the SL resources indicated by the SCI.

The operation method may further include receiving a downlink control information (DCI) from the base station; identifying from the DCI a slot format indicator (SFI) that indicates resources used for SL communication among the flexible resources; and performing DL communication, UL communication, or the SL communication using resources configured by the TDD-UL-DL-configuration common information and the SFI.

Furthermore, according to the exemplary embodiments of the present disclosure, a base station in a communication system may include a processor, a transceiver operated by the processor, and a memory configured to store at least one instruction executable by the processor. Additionally, when executed by the processor, the at least one instruction may be configured to generate time division duplex (TDD)-uplink-downlink configuration (TDD-UL-DL-configuration) common information, the TDD-UL-DL-configuration common information including information regarding a DL-UL transmission period, a DL pattern indicating DL resources, a UL pattern indicating UL resources, and a sidelink (SL) pattern indicating SL resources; and transmit to a user equipment (UE) system information including the TDD-UL-DL-configuration common information. The DL resources, the UL resources, and the SL resources are included in the DL-UL transmission period, and resources other than the DL resources, the UL resources, and the SL resources among all resources included in the DL-UL transmission period are flexible resources.

The SL pattern may include at least one of information that indicates a number of consecutive SL slots in the DL-UL transmission period, information that indicates a number of consecutive SL symbols located before a starting SL slot among the consecutive SL slots, information that indicates a number of consecutive SL symbols located after an ending SL slot among the consecutive SL slots, an index of the starting SL slot, and an index of the ending SL slot. The SL pattern may be used to reconfigure one or more UL resources among the UL resources configured by the UL pattern to SL resources used for SL communication.

The at least one instruction may be further configured to generate TDD-UL-DL-configuration dedicated information including a slot pattern that indicates resources used for SL communication among the flexible resources; and transmit to the UE a radio resource control (RRC) message including the TDD-UL-DL-configuration dedicated information. The slot pattern may include at least one of a slot index, information that indicates that all symbols included in a slot indicated by the slot index are SL symbols, information that indicates a number of consecutive SL symbols among all the symbols included in the slot indicated by the slot index, an index of a starting SL symbol among the consecutive SL symbols, and an index of an ending SL symbol among the consecutive SL symbols.

The at least one instruction may be further configured to generate a downlink control information (DCI) including a slot format indicator (SFI) that indicates resources used for SL communication among the flexible resources; and transmit the DCI to the UE through a physical downlink control channel (PDCCH).

Furthermore, according to the exemplary embodiments of the present disclosure, a first user equipment (UE) in a communication system may include a processor, a transceiver operated by the processor, and a memory configured to store at least one instruction executable by the processor. When executed by the processor, the at least one instruction may be configured to receive from a base station system information including time division duplex (TDD)-uplink-downlink configuration (TDD-UL-DL-configuration) common information; and identify information regarding a DL-UL transmission period, a DL pattern indicating DL resources, a UL pattern indicating UL resources, and a sidelink (SL) pattern indicating SL resources, which are included in the TDD-UL-DL-configuration common information.

The DL resources, the UL resources, and the SL resources are included in the DL-UL transmission period, and resources other than the DL resources, the UL resources, and the SL resources among all resources included in the DL-UL transmission period are flexible resources. The SL pattern may include at least one of information that indicates a number of consecutive SL slots in the DL-UL transmission period, information that indicates a number of consecutive SL symbols located before a starting SL slot among the consecutive SL slots, information that indicates a number of consecutive SL symbols located after an ending SL slot among the consecutive SL slots, an index of the starting SL slot, and an index of the ending SL slot. The SL pattern may be used to reconfigure one or more UL resources among the UL resources configured by the UL pattern to SL resources used for SL communication.

The at least one instruction may be further configured to receive from the base station a radio resource control (RRC) message including TDD-UL-DL-configuration dedicated information; identify from the TDD-UL-DL-configuration dedicated information a slot pattern that indicates resources used for SL communication among the flexible resources; and perform DL communication, UL communication, or the SL communication by using resources configured by the TDD-UL-DL-configuration common information and the TDD-UL-DL-configuration dedicated information.

The slot pattern may include at least one of a slot index, information that indicates that all symbols included in a slot indicated by the slot index are SL symbols, information that indicates a number of consecutive SL symbols among all the symbols included in the slot indicated by the slot index, an index of a starting SL symbol among the consecutive SL symbols, and an index of an ending SL symbol among the consecutive SL symbols.

The at least one instruction may be further configured to receive a downlink control information (DCI) from the base station; identify from the DCI a slot format indicator (SFI) that indicates resources used for SL communication among the flexible resources; and perform DL communication, UL communication, or the SL communication using resources configured by the TDD-UL-DL-configuration common information and the SFI.

The at least one instruction may be further configured to transmit to a second UE a sidelink control information (SCI) including information indicating the SL resources configured by the TDD-UL-DL-configuration common information and the SFI; and perform the SL communication with the second UE by using the SL resources indicated by the SCI.

According to the exemplary embodiments of the present disclosure, sidelink (SL) resources may be configured using at least one of the time division duplex-uplink-downlink-configuration (TDD-UL-DL-configuration) common information, the TDD-UL-DL-configuration dedicated information, and the downlink control information (DCI). The user equipment (UE) may be configured to perform sidelink communication with another UE using the SL resources. Alternatively, the SL resources may be configured by the UE, and the UE may be configured to transmit sidelink control information (SCI) including information that indicates the SL resources to another UE. The UE may be configured to perform the sidelink communication with another UE using the SL resources indicated by the SCI. Therefore, the sidelink communication may be efficiently performed, and the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 13 is a conceptual diagram illustrating a slot configured by SL resource information in a communication system according to an exemplary embodiment of the present disclosure.

Figure 1:
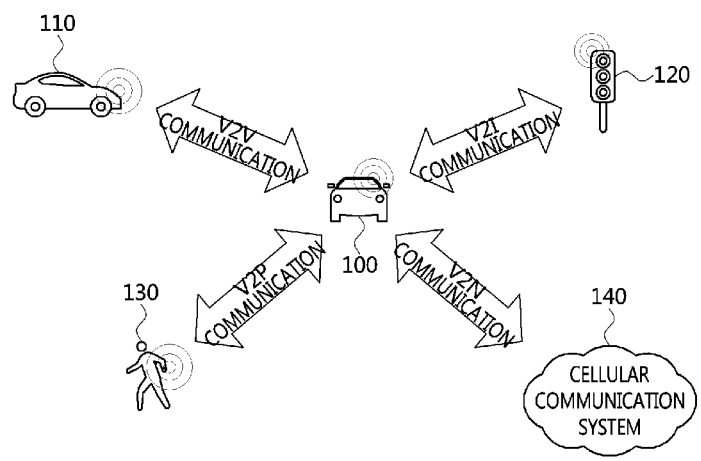
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or controller may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100) and a second vehicle 110 (e.g., a communication node located within the vehicle 110). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located within the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located within the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm indicating a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located within the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
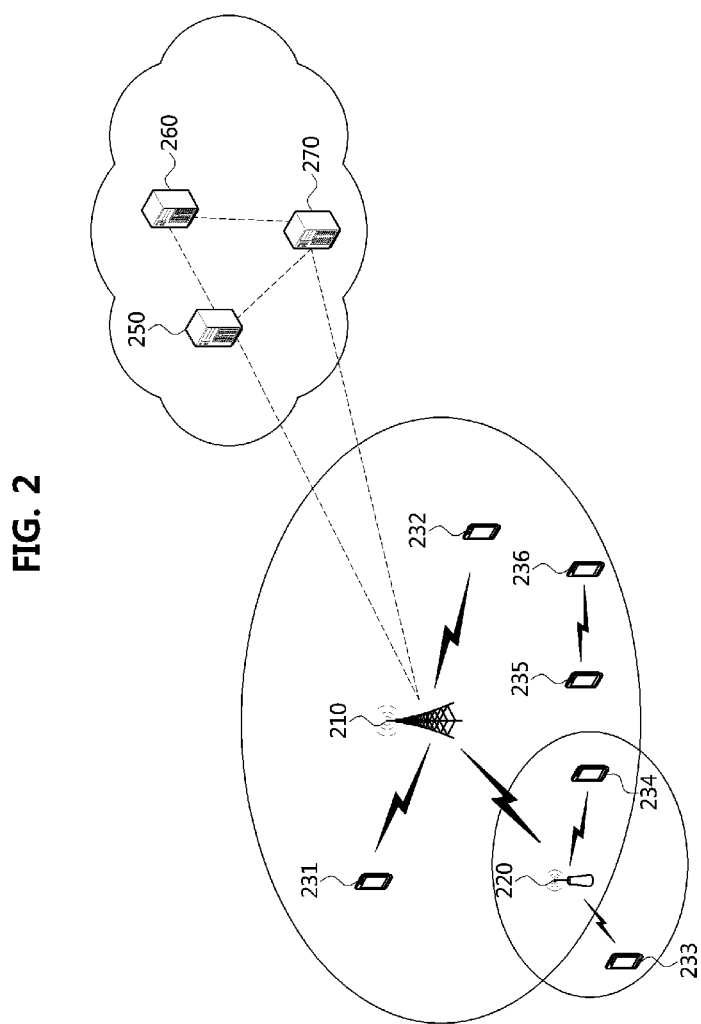
FIG. 2 is a conceptual diagram illustrating a cellular communication system according to an exemplary embodiment of the present disclosure.

FIG. 2 is a conceptual diagram illustrating embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
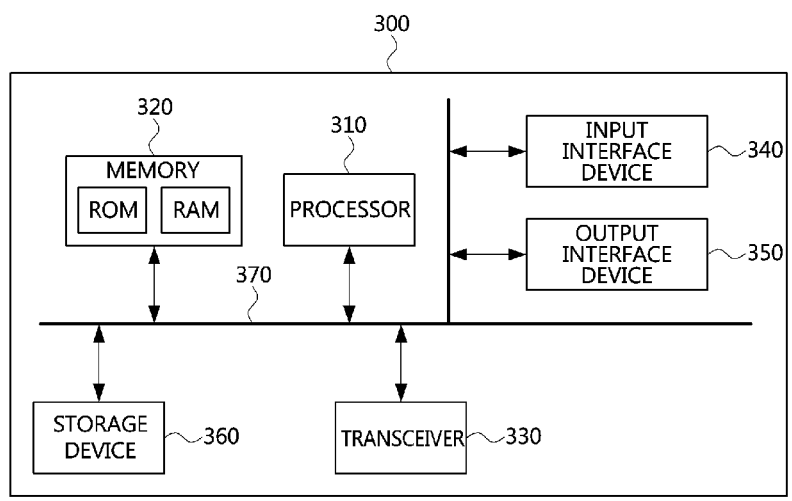
FIG. 3 is a conceptual diagram illustrating a communication node constituting a cellular communication system according to an exemplary embodiment of the present disclosure.

FIG. 3 is a conceptual diagram illustrating embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations that correspond to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
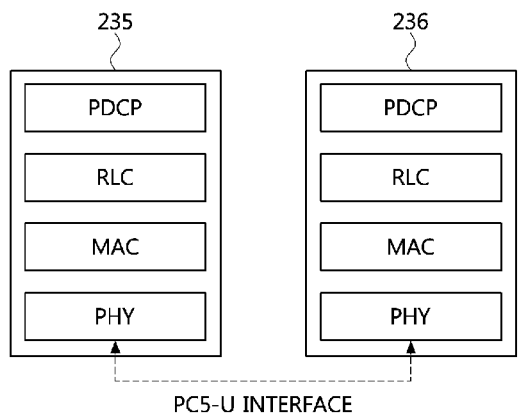
FIG. 4 is a block diagram illustrating a user plane protocol stack of an UE performing sidelink communication according to an exemplary embodiment of the present disclosure.

FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
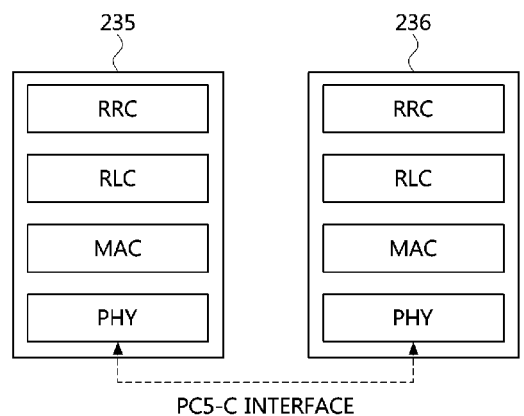
FIG. 5 is a block diagram illustrating a control plane protocol stack of an UE performing sidelink communication according to an exemplary embodiment of the present disclosure.
Figure 6:
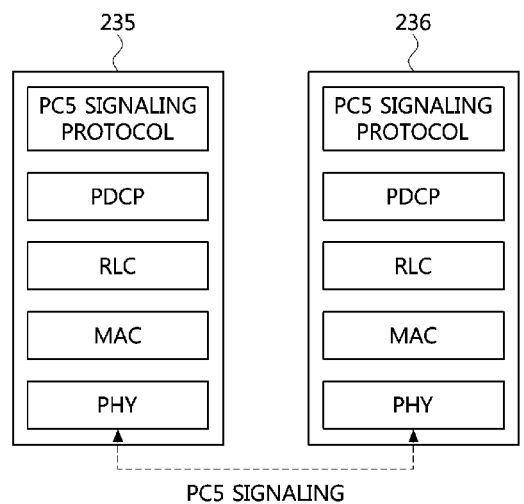
FIG. 6 is a block diagram illustrating a control plane protocol stack of an UE performing sidelink communication according to another exemplary embodiment of the present disclosure.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data. The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure.

In particular, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. The sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. The sidelink data may be transmitted and received through resources selected autonomously by the UE (e.g., UE 235 or 236) within the resource pool configured by the dedicated RRC signaling procedure or the broadcast RRC signaling procedure.

Further, sidelink resource configuration methods will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a UE #1 (e.g., first vehicle) is described, a corresponding UE #2 (e.g., second vehicle) may be configured to perform an operation that corresponds to the operation of the UE #1. Conversely, when an operation of the UE #2 (e.g., second vehicle) is described, the corresponding UE #1 (e.g., first vehicle) may be configured to perform an operation that corresponds to the operation of the UE #2. In the exemplary embodiments described below, the operation of the vehicle may be the operation of the communication node located within the vehicle.

In the communication system, downlink (DL) resources, uplink (UL) resources, and sidelink (SL) resources may be configured. The DL resources may be used for DL communication between the base station and the UE (e.g., vehicle). The UL resources may be used for UL communication between the base station and the UE (e.g., vehicle). The SL resources may be used for SL communication between the UEs (e.g., vehicles). The DL resources, UL resources, and SL resources may be configured as follows.

Figure 7:
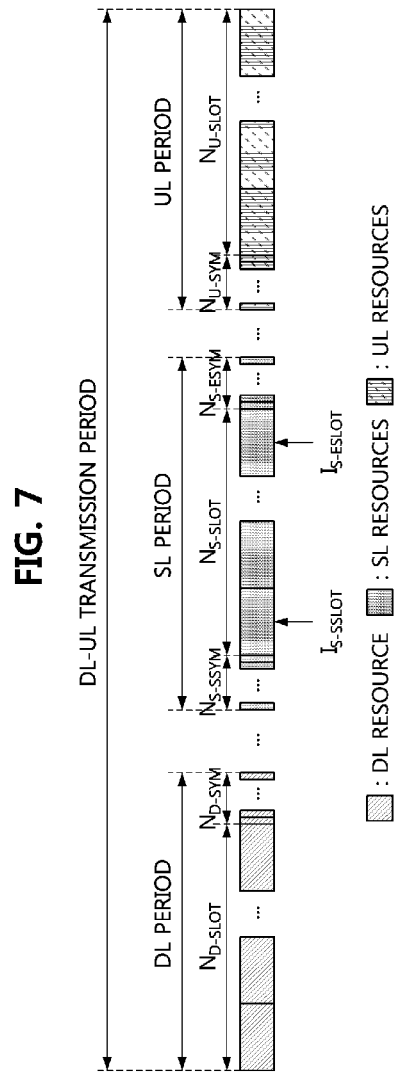
FIG. 7 is a conceptual diagram illustrating a DL-UL transmission period including DL resources, UL resources, and SL resources in a communication system according to an exemplary embodiment of the present disclosure.

FIG. 7 is a conceptual diagram illustrating a first exemplary embodiment of a DL-UL transmission period including DL resources, UL resources, and SL resources in a communication system. As shown in FIG. 7, a DL-UL transmission period may be configured, and DL resources and UL resources may be configured within the DL-UL transmission period. Additionally, SL resources may be additionally configured within the DL-UL transmission period. In particular, the DL-UL transmission period may be referred to as a DL-SL-UL transmission period. A resource that is not configured as a DL resource, a UL resource, or an SL resource within the DL-UL transmission period may be configured as a flexible (FL) resource, and the FL resource may be overridden to a DL resource, a UL resource, or an SL resource.

The length (e.g., periodicity) of the DL-UL transmission period may be about 0.5 ms, 0.625 ms, 1 ms, 1.25 ms, 2.5 ms, 5 ms, or 10 ms. In other words, the DL-UL transmission period may be repeated every about 0.5 ms, 0.625 ms, 1 ms, 1.25 ms, 2.5 ms, 5 ms, or 10 ms in the time axis. For example, a plurality of DL-UL transmission periods may be configured consecutively in the time axis, and DL resources, UL resources, and SL resources may be configured identically across the plurality of DL-UL transmission periods.

The DL resources may be indicated by a DL pattern described in Table 3 below. Particularly, a DL slot may be a slot consisting only of DL symbols, and a DL symbol may be used for DL communication.

TABLE 3

| DL pattern | Description |
| --- | --- |
| $N_{D\text{-}SLOT}$ | The number of consecutive DL slots from a starting time point of a DL-UL transmission period |
| $N_{D\text{-}SYM}$ | The number of consecutive DL symbols from an ending time point of the consecutive DL slots indicated by $N_{D\text{-}SLOT}$ |

The UL resources may be indicated by a UL pattern described in Table 4 below. Particularly, a UL slot may be a slot consisting only of UL symbols, and a UL symbol may be used for UL communication.

TABLE 4

| UL pattern | Description |
| --- | --- |
| $N_{U\text{-}SLOT}$ | The number of consecutive UL slots. An ending time point of the consecutive UL slots is identical to an ending time point of a DL-UL transmission period. |
| $N_{U\text{-}SYM}$ | The number of consecutive UL symbols located before a first UL slot (i.e., starting UL slot) among the consecutive UL slots indicated by $N_{U\text{-}SLOT}$. An ending time point of the consecutive UL symbols is identical to a starting time point of the consecutive UL slots. |

The SL resources may be indicated by an SL pattern described in Table 5 below. Particularly, an SL slot may be a slot consisting only of SL symbols, and an SL symbol may be used for SL communication. When a plurality of SL periods used for SL communication are present within one DL-UL transmission period, a plurality of SL patterns may be configured. For example, when there are an SL period #1 and an SL period #2 within one DL-UL transmission period, an SL pattern #1 indicating the SL period #1 may be configured and an SL pattern #2 indicating the SL period #2 may be configured.

TABLE 5

| SL pattern | Description |
| --- | --- |
| $N_{S\text{-}SLOT}$ | The number of consecutive SL slots |
| $N_{S\text{-}SSYM}$ | The number of consecutive SL symbols located before a first SL slot (i.e., starting SL slot) among the consecutive SL slots indicated by $N_{S\text{-}SLOT}$. An ending time point of the consecutive SL symbols is identical to a starting time point of the consecutive SL slots. |
| $N_{S\text{-}ESYM}$ | The number of consecutive SL symbols located after a last SL slot (i.e., ending SL slot) among the consecutive SL slots indicated by $N_{S\text{-}SLOT}$. A starting time point of the consecutive SL symbols is identical to an ending time point of the consecutive SL slots. |
| $I_{S\text{-}SSLOT}$ | An index of the first SL slot (i.e., starting SL slot) among the consecutive SL slots indicated by $N_{S\text{-}SLOT}$ |
| $I_{S\text{-}ESLOT}$ | An index of the last SL slot (i.e., ending SL slot) among the consecutive SL slots indicated by $N_{S\text{-}SLOT}$ |

A method of signaling information indicating the DL resources, the UL resources, and the SL resources shown in FIG. 7 may be configured follows.

Figure 8:
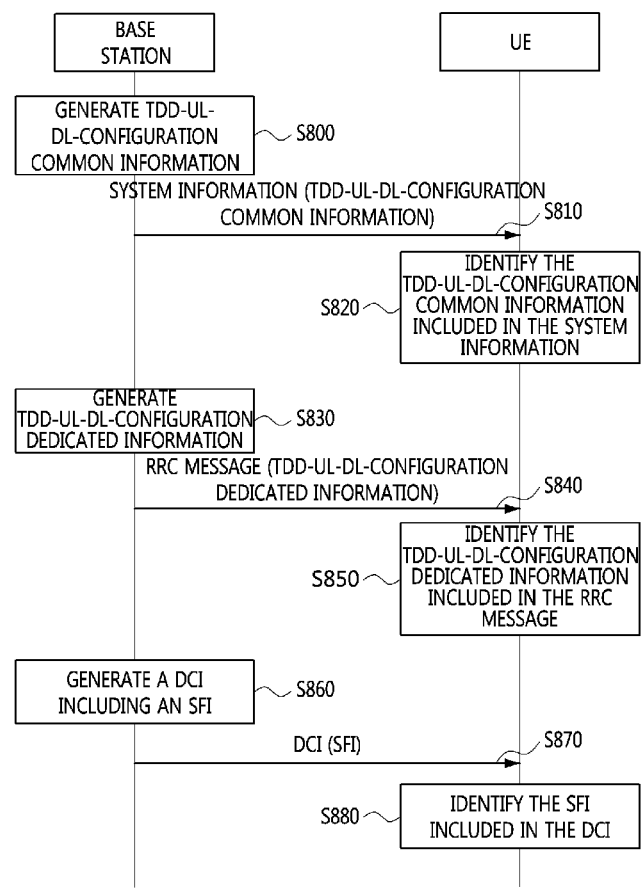
FIG. 8 is a sequence chart illustrating a resource configuration information signaling method in a communication system according to an exemplary embodiment of the present disclosure.

FIG. 8 is a sequence chart illustrating a first exemplary embodiment of a resource configuration information signaling method in a communication system. As shown in FIG. 8, a communication system may include a base station and a UE. The base station may be the base station 210 shown in FIG. 2, and the UE may be one of the UEs 231 to 236 shown in FIG. 2. The base station and the UE may be configured to be the same as or similar to the communication node 300 shown in FIG. 3. The UE may support the protocol stacks shown in FIGS. 4 to 6.

The base station may be configured to generate TDD-UL-DL-configuration common information (e.g., 'TDD-UL-DL-ConfigCommon') (S800). The TDD-UL-DL-configuration common information may include information indicating a subcarrier spacing and a TDD-UL-DL-pattern #1. In addition, the TDD-UL-DL-configuration common information may further include a TDD-UL-DL-pattern #2. The TDD-UL-DL-pattern #2 may be optionally used.

The TDD-UL-DL-pattern #1 may include information indicating a periodicity (e.g., length) of a DL-UL transmission period, a DL pattern described in Table 3, and a UL pattern described in Table 4. Additionally, the TDD-UL-DL-pattern #1 may further include an SL pattern described in Table 5. Some parameters in the SL pattern may be included in the TDD-UL-DL-pattern #1. For example, ($I_{S\text{-}SSLOT}$ and $I_{S\text{-}ESLOT}$), ($I_{S\text{-}SSLOT}$ and $N_{S\text{-}SLOT}$) or ($I_{S\text{-}ESLOT}$ and $N_{S\text{-}SLOT}$) may be included in TDD-UL-DL-pattern #1, and at least one of $N_{S\text{-}SSYM}$ and $N_{S\text{-}ESYM}$ may be further included in TDD-UL-DL-pattern #1 when there are consecutive SL symbols.

When the TDD-UL-DL-configuration common information includes the TDD-UL-DL-pattern #2, the TDD-UL-DL-pattern #2 may include at least one of a DL pattern described in Table 3, a UL pattern described in Table 4, and an SL pattern described in Table 5. Additionally, the TDD-UL-DL-pattern #2 may further include information indicating a periodicity (e.g., length) of a DL-UL transmission period. The DL pattern, the UL pattern, and the SL pattern included in the TDD-UL-DL-pattern #2 may be different from the DL pattern, the UL pattern, and the SL pattern included in the TDD-UL-DL-pattern #1, respectively.

When the TDD-UL-DL-configuration common information includes the TDD-UL-DL-pattern #1 and the TDD-UL-DL-pattern #2, a DL-UL transmission period #1 according to the TDD-UL-DL-pattern #1 and a DL-UL transmission period #2 according to the TDD-UL-DL-pattern #2 may be configured in the time axis. The DL-UL transmission period #2 may be continuous with the DL-UL transmission period #1. In other words, the (DL-UL transmission period #1+DL-UL transmission period #2) may be periodically repeated in the time axis, and the length of (DL-UL transmission period #1+DL-UL transmission period #2) may be equal to or less than about 20 ms.

The base station may be configured to transmit system information (e.g., system information block (SIB)) including the TDD-UL-DL-configuration common information (S810). The UE may be configured to receive the system information from the base station, and identify the TDD-UL-DL-configuration common information included in the system information (S820). Accordingly, the UE may be configured to identify the DL-UL transmission period based on the TDD-UL-DL-configuration common information, and identify at least one of the DL resources, the UL resources, and the SL resources within the DL-UL transmission period. In particular, the UE may perform DL communication with the base station using the DL resources, perform UL communication with the base station using the UL resources, and perform SL communication with other UE(s) using the SL resources.

The base station may further be configured to generate TDD-UL-DL-configuration dedicated information (e.g., 'TDD-UL-DL-ConfigDedicated') when necessary (S830). The TDD-UL-DL-configuration dedicated information may be used to reconfigure a FL resource (e.g., FL slot or FL symbol) configured by the TDD-UL-DL-configuration common information to a DL resource (e.g., DL slot or DL symbol), a UL resource (e.g., UL slot or UL symbol) or an SL resource (e.g., SL slot or SL symbol). The TDD-UL-DL-configuration dedicated information may include a slot pattern described in Table 6 below. For example, the TDD-UL-DL-configuration dedicated information may include one or more parameters from among the parameters listed in Table 6 below.

TABLE 6

| Slot pattern | Description |
|---|---|
| $I_{SLOT}$ | Slot index |
| $A_{DL}$ | Indicates that all symbols included in a slot indicated by $I_{SLOT}$ are DL symbols. |
| $A_{UL}$ | Indicates that all symbols included in a slot indicated by $I_{SLOT}$ are UL symbols. |
| $A_{SL}$ | Indicates that all symbols included in a slot indicated by $I_{SLOT}$ are SL symbols. |
| $N_{D\text{-}SYM\text{-}SLOT}$ | The number of DL symbols among all symbols included in a slot indicated by $I_{SLOT}$. A starting time point of the DL symbols is identical to a starting time point of the corresponding slot. |
| $N_{U\text{-}SYM\text{-}SLOT}$ | The number of UL symbols among all symbols included in a slot indicated by $I_{SLOT}$. An ending time point of the UL symbols is identical to an ending time point of the corresponding slot. |
| $N_{S\text{-}SYM\text{-}SLOT}$ | The number of SL symbols among all symbols included in a slot indicated by $I_{SLOT}$. |
| $I_{S\text{-}SSYM}$ | An index of a first SL symbol (i.e., starting SL symbol) among consecutive SL symbols indicated by $N_{S\text{-}SYM\text{-}SLOT}$. |
| $I_{S\text{-}ESYM}$ | An index of a last SL symbol (i.e., ending SL symbol) among consecutive SL symbols indicated by $N_{S\text{-}SYM\text{-}SLOT}$. |

A slot configured by the TDD-UL-DL-configuration dedicated information may be as follows.

Figure 9:
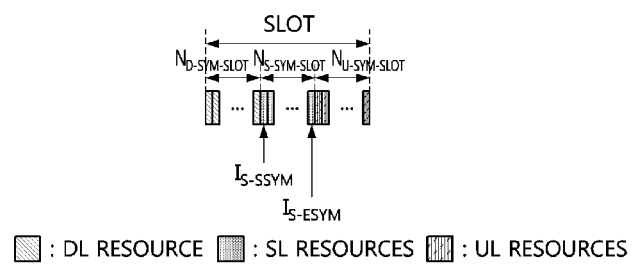
FIG. 9 is a conceptual diagram illustrating a slot configured by TDD-UL-DL-configuration dedicated information in a communication system according to an exemplary embodiment of the present disclosure.

FIG. 9 is a conceptual diagram illustrating a first exemplary embodiment of a slot configured by TDD-UL-DL-configuration dedicated information in a communication system. As shown in FIG. 9, symbols included in one slot may be configured as DL symbols, UL symbols, or SL symbols according to the TDD-UL-DL-configuration dedicated information. In particular, one slot may not include an FL symbol.

Figure 10:
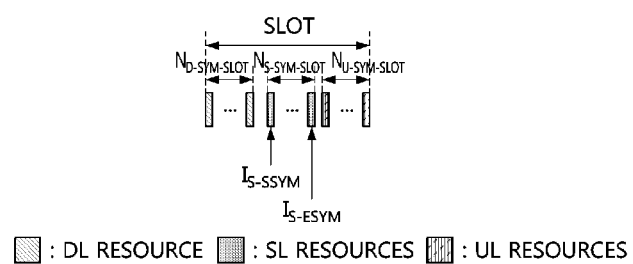
FIG. 10 is a conceptual diagram illustrating a slot configured by TDD-UL-DL-configuration dedicated information in a communication system according to another exemplary embodiment of the present disclosure.

FIG. 10 is a conceptual diagram illustrating a second exemplary embodiment of a slot configured by TDD-UL-DL-configuration dedicated information in a communication system. As shown in FIG. 10, symbols included in one slot may be configured as DL symbols, UL symbols, or SL symbols according to the TDD-UL-DL-configuration dedicated information. Among the symbols included in one slot, a symbol that is not configured as a DL symbol, a UL symbol, or an SL symbol may be an FL symbol.

Referring again to FIG. 8, the base station may be configured to transmit an RRC message including the TDD-UL-DL-configuration dedicated information to the UE (S840). The RRC message including the TDD-UL-DL-configuration dedicated information may be a cell-specific RRC message or a UE-specific RRC message. The UE may be configured to receive the RRC message from the base station and identify the TDD-UL-DL-configuration dedicated information included in the RRC message (S850). Accordingly, the UE may be configured to identify at least one of the DL resources, the UL resources, and the SL resources configured by the TDD-UL-DL-configuration common information and the TDD-UL-DL-configuration dedicated information. In particular, the UE may perform DL communication with the base station using the DL resources, perform UL communication with the base station using the UL resources, and perform SL communication with other UE(s) using the SL resources.

On the other hand, a resource (e.g., a DL resource, a UL resource, a SL resource) configured by the TDD-UL-DL-configuration common information or the (TDD-UL-DL-configuration common information+TDD-UL-DL-configuration dedicated information) may be reconfigured by a slot format indicator (SFI). For example, an SFI may be used to reconfigure a FL resource configured by the TDD-UL-DL-configuration common information or the (TDD-UL-DL-configuration common information+ TDD-UL-DL-configuration dedicated information) to a DL symbol, a UL symbol, or an SL symbol. The SFI may be configured as shown in Table 7 below. The SFI may not be limited to examples shown in Table 7 below, and may be variously configured. In Table 7, 'D' may indicate a DL symbol, IF may indicate a UL symbol, 'S' may indicate an SL symbol, and 'F' may indicate an FL symbol.

TABLE 7

| | Symbol index in Slot | | | | | | | | | | | | | |
|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 |
| 56 | S | S | S | S | S | S | S | S | S | S | S | S | S | S |
| 57 | D | D | D | D | D | D | D | D | D | D | D | D | D | F |
| 58 | D | D | D | D | D | D | D | D | D | D | D | D | F | F |
| 59 | D | D | D | D | D | D | D | D | D | D | F | S | S | S |
| 60 | D | D | D | D | D | D | D | D | D | F | S | S | S | S |
| 61 | D | D | D | D | D | D | D | D | F | F | F | F | F | F |
| 62 | S | S | S | S | S | S | S | S | S | S | S | S | S | U |
| 63 | S | S | S | S | S | S | S | S | S | S | S | S | U | U |
| 64 | S | U | U | U | U | U | U | U | U | U | U | U | U | U |
| 65 | S | S | U | U | U | U | U | U | U | U | U | U | U | U |
| 66 | S | S | S | U | U | U | U | U | U | U | U | U | U | U |
| 67 | S | S | S | S | U | U | U | U | U | U | U | U | U | U |
| 68 | S | S | S | S | S | U | U | U | U | U | U | U | U | U |
| 69 | S | S | S | S | S | S | U | U | U | U | U | U | U | U |
| 70 | D | F | S | S | S | S | S | S | S | S | S | S | S | S |
| 71 | D | D | F | S | S | S | S | S | S | S | S | S | S | S |
| 72 | D | D | D | F | S | S | S | S | S | S | S | S | S | S |
| 73 | D | F | S | S | S | S | S | S | S | S | S | S | S | U |
| 74 | D | D | F | S | S | S | S | S | S | S | S | S | S | U |
| 75 | D | D | D | F | S | S | S | S | S | S | S | S | S | U |
| 76 | D | F | S | S | S | S | S | S | S | S | S | S | U | U |
| 77 | D | D | F | S | S | S | S | S | S | S | S | S | U | U |
| 78 | D | D | D | F | S | S | S | S | S | S | S | S | U | U |
| 79 | D | F | S | S | S | S | S | S | S | S | S | U | U | U |
| 80 | D | D | F | S | S | S | S | S | S | S | S | U | U | U |

The base station may be configured to generate a downlink control information (DCI) including an SFI (S860). The DCI including the SFI may be a DCI format 2_0. The base station may be configured to transmit the DCI including the SFI to the UE through a physical downlink control channel (PDCCH) (S870). The UE may be configured to receive the DCI from the base station and identify the SFI included in the DCI (S880). Accordingly, the UE may be configured to identify one or more of the DL resources, the UL resources, and the SL resources configured by (TDD-UL-DL-configuration common information+ DCI) or (TDD-UL-DL-configuration common information+ TDD-UL-DL-configuration dedicated information+ DCI). In particular, the UE may be configured to perform DL communication with the base station using the DL resources, perform UL communication with the base station using the UL resources, and perform SL communication with other UE(s) using the SL resources.

Meanwhile, UL resources may be used as SL resources in the communication system. In particular, the base station may be configured to transmit to the UE information (hereinafter referred to as an 'SL reconfiguration pattern') that indicates an UL resource used as an SL resource among the UL resources. For example, the base station may be configured to generate TDD-UL-DL-configuration common information including information that indicates a subcarrier spacing and a pattern #1. The TDD-UL-DL-configuration common information may further include a pattern #2. Each of the pattern #1 and the pattern #2 may include a DL pattern described in Table 3 and a UL pattern described in Table 4. Additionally, each of the pattern #1 and the pattern #2 may further include an SL reconfiguration pattern described in Table 8 below. The SL reconfiguration pattern may include one or more of parameters described in Table 8 ($N'_{S-SLOT}$, $N'_{S-SSYM}$, $N'_{S-ESYM}$, $I'_{S-SSLOT}$, $I'_{S-ESLOT}$).

TABLE 8

| SL reconfiguration pattern | Description |
|---|---|
| $N'_{S-SLOT}$ | The number of consecutive SL slots in a UL period |
| $N'_{S-SSYM}$ | The number of consecutive SL symbols located before a first SL symbol (i.e., starting SL slot) among the consecutive SL slots indicated by $N'_{S-SLOT}$. An ending time point of the consecutive SL symbols is identical to a starting time point of the consecutive SL slots. |
| $N'_{S-ESYM}$ | The number of consecutive SL symbols located after a last SL symbol (i.e., ending SL slot) among the consecutive SL slots indicated by $N'_{S-SLOT}$. A starting time point of the consecutive SL symbols is identical to an ending time point of the consecutive SL slots. |
| $I'_{S-SSLOT}$ | An index of the first SL slot (i.e., starting SL slot) among the consecutive SL slots indicated by $N'_{S-SLOT}$ |
| $I'_{S-ESLOT}$ | An index of the last SL slot (i.e., ending SL slot) among the consecutive SL slots indicated by $N'_{S-SLOT}$ |

Therefore, some UL resources among the UL resources belonging to the UL period configured by the UL pattern may be reconfigured to SL resources by the SL reconfiguration pattern. The SL resources reconfigured by the SL reconfiguration pattern may be as follows.

Figure 11:
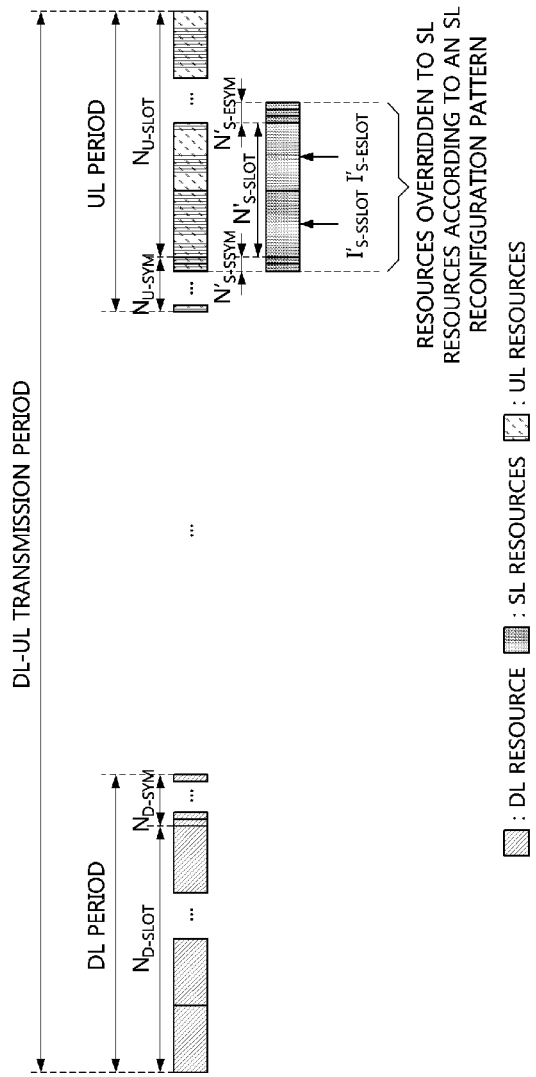
FIG. 11 is a conceptual diagram illustrating a DL-UL transmission period including DL resources, UL resources, and SL resources in a communication system according to another exemplary embodiment of the present disclosure.

FIG. 11 is a conceptual diagram illustrating a second exemplary embodiment of a DL-UL transmission period including DL resources, UL resources, and SL resources in a communication system. As shown in FIG. 11, a DL-UL transmission period may be configured, and a DL period and a UL period may be configured within the DL-UL transmission period. The DL period may be configured by a DL pattern included in the TDD-UL-DL-configuration common information, and the UL period may be configured by a UL pattern included in the TDD-UL-DL-configuration common information.

Additionally, some UL resources in the UL period may be reconfigured to SL resources by an SL reconfiguration pattern included in the TDD-UL-DL-configuration common information. Thus, when the TDD-UL-DL-configuration common information is received from the base station, the UE may be configured to identify one or more of the DL resources, the UL resources, and the SL resources indicated by the TDD-UL-DL-configuration common information, and perform DL communication, UL communication, or SL communication using the corresponding resources.

Alternatively, the SL reconfiguration pattern may be included in the TDD-UL-DL-configuration dedicated information instead of the TDD-UL-DL-configuration common information. In particular, some UL resources among the UL resources belonging to the UL period configured by the TDD-UL-DL-configuration common information may be reconfigured to SL resources by the SL reconfiguration pattern included in the TDD-UL-DL configuration dedicated information. Therefore, when the TDD-UL-DL-configuration common information and the TDD-UL-DL-configuration dedicated information are received from the base station, the UE may be configured to identify the DL resources and the UL resources indicated by the TDD-UL-DL-configuration common information, and identify the UL resources to be reconfigured to the SL resources by the TDD-UL-DL-configuration dedicated information among the UL resources indicated by the TDD-UL-DL-configuration common information. The UE may be configured to perform DL communication, UL communication, or SL communication using the resources configured by the UL-DL-configuration common information and the UL-DL-configuration dedicated information.

Alternatively, the SL reconfiguration pattern may be included in a DCI instead of the TDD-UL-DL-configuration common information and TDD-UL-DL-configuration dedicated information. In particular, some resources among the UL resources belonging to the UL period configured by the TDD-UL-DL-configuration common information or the (TDD-UL-DL-configuration common information+ TDD-UL-DL-configuration dedicated information) may be reconfigured to SL resources by the SL reconfiguration pattern included in the DCI.

Therefore, when the TDD-UL-DL-configuration common information and/or the TDD-UL-DL-configuration dedicated information is received from the base station, the UE may be configured to identify the DL resources or the UL resources indicated by the TDD-UL-DL-configuration common information and/or the TDD-UL-DL-configuration dedicated information. Thereafter, when the DCI including the SL reconfiguration pattern is received from the base station, the UE may be configured to identify the UL resources to be reconfigured by the DCI to the SL resources among the UL resources indicated by the TDD-UL-DL-configuration common information and/or the TDD-UL-DL-configuration dedicated information. The UE may be configured to perform DL communication, UL communication, or SL communication using the resources configured by the (UL-DL-configuration common information+ DCI) or the (UL-DL-configuration common information+UL-DL-configuration dedicated information+ DCI).

Meanwhile, SL resources may be configured by the UE, and the sidelink communication may be performed using the SL resources configured by the UE.

Figure 12:
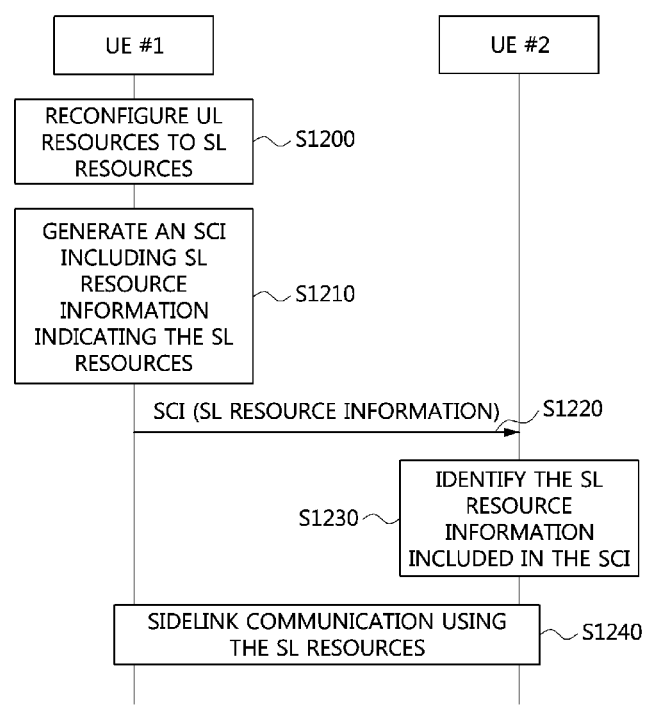
FIG. 12 is a sequence chart illustrating a sidelink communication method in a communication system according to an exemplary embodiment of the present disclosure.

FIG. 12 is a sequence chart illustrating a first exemplary embodiment of a sidelink communication method in a communication system. As shown in FIG. 12, a communication system may include a UE #1 and a UE #2. For example, the UE #1 may be the UE 235 shown in FIG. 2 and the UE #2 may be the 236 shown in FIG. 2. Each of the UE #1 and the UE #2 may be connected to a base station and may be located within coverage of the base station. Alternatively, the UE #2 may be located outside the coverage of the base station. The UE #1 and the UE #2 may be configured to be the same as or similar to the communication node 300 shown in FIG. 3. The UE #1 and the UE #2 may support the protocol stacks shown in FIGS. 4 to 6.

The UE #1 may reconfigure UL resources configured through at least one of the TDD-UL-DL-configuration common information, the TDD-UL-DL-configuration dedicated information, and the DCI to SL resources (S1200). In addition, the UE #1 may reconfigure FL resources configured through at least one of the TDD-UL-DL-configuration common information, the TDD-UL-DL-configuration dedicated information, and the DCI to SL resources. The UE #1 may be configured to generate a sidelink control information (SCI) including SL resource information that indicates the reconfigured SL resources (S1210). The SL resource information may include one or more of parameters listed in Table 9 below.

TABLE 9

| SL resource information | Description |
|---|---|
| $I_{SLOT}$ | Slot index |
| $N'_{S\text{-}SYM\text{-}SLOT}$ | The number of consecutive FL/UL symbols reconfigured to SL symbols among FL/UL symbols included in a slot indicated by $I_{SLOT}$ |
| $I'_{S\text{-}SSYM}$ | An index of a first SL symbol (i.e., starting SL symbol) among consecutive SL symbols indicated by $N'_{S\text{-}SYM\text{-}SLOT}$ |
| $I'_{S\text{-}ESYM}$ | An index of a last SL symbol (i.e., ending SL symbol) among consecutive SL symbols indicated by $N'_{S\text{-}SYM\text{-}SLOT}$ |

UL symbols included in a specific slot may be overridden to be SL symbols by the SL resource information as follows.

FIG. 13 is a conceptual diagram illustrating a first exemplary embodiment of a slot configured by SL resource information in a communication system. As shown in FIG. 13, the symbols included in one slot may be configured as DL symbols, UL symbols, or FL symbols by at least one of the UL-DL-configuration common information, the UL-DL-configuration dedicated information, and the DCI. Some UL symbols among the UL symbols included in one slot may be reconfigured to SL symbols by the SL resource information. Here, 'D' may indicate a DL symbol, 'U' may indicate a UL symbol, 'F' may indicate an FL symbol, and 'S' may indicate an SL symbol.

Referring again to FIG. 12, the UE #1 may transmit an SCI including the SL resource information to the UE #2 (S1220). The UE #2 may be configured to receive the SCI from the UE #1 and may be configured to identify the SL resource information included in the SCI (S1230). The UE #1 and the UE #2 may be configured to perform the SL communication using the SL resources indicated by the SL resource information included in the SCI (S1240).

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a base station in a communication system, comprising:
    generating, by a processor, time division duplex (TDD)-uplink-downlink configuration (TDD-UL-DL-configuration) common information, the TDD-UL-DL-configuration common information including information regarding a DL-UL transmission period, a DL pattern indicating DL resources, a UL pattern indicating UL resources, and a sidelink (SL) pattern indicating SL resources, the DL resources, the UL resources, and the SL resources being included in the DL-UL transmission period, and resources other than the DL resources, the UL resources, and the SL resources among all resources included in the DL-UL transmission period being flexible resources;
    transmitting, by the processor, to a user equipment (UE) system information including the TDD-UL-DL-configuration common information;
    generating, by the processor, TDD-UL-DL-configuration dedicated information including a slot pattern that indicates resources used for SL communication among the flexible resources configured by the TDD-UL-DL-configuration common information; and
    transmitting, by the processor, to the UE a radio resource control (RRC) message including the TDD-UL-DL-configuration dedicated information,
    wherein one or more flexible resources among the flexible resources configured by the TDD-UL-DL-configuration common information are overwritten by the TDD-UL-DL-configuration dedicated information to be the resources used for the SL communication, and
    wherein the SL pattern includes information indicating a number of consecutive SL symbols located before a starting SL slot among consecutive SL slots in the DL-UL transmission period, information indicating a number of consecutive SL symbols located after an ending SL slot among the consecutive SL slots, an index of the starting SL slot, and an index of the ending SL slot.

2. The operation method according to claim 1, wherein the SL pattern includes information indicating a number of the consecutive SL slots.

3. The operation method according to claim 1, wherein the SL pattern is used to reconfigure one or more UL resources among the UL resources configured by the UL pattern to SL resources used for SL communication.

4. The operation method according to claim 1, wherein the slot pattern includes at least one of the group consisting of: a slot index, information indicating that all symbols included in a slot indicated by the slot index are SL symbols, information indicating a number of consecutive SL symbols among all the symbols included in the slot indicated by the slot index, an index of a starting SL symbol among the consecutive SL symbols, and an index of an ending SL symbol among the consecutive SL symbols.

5. An operation method of a first user equipment (UE) in a communication system, comprising:
    receiving, by a processor, from a base station system information including time division duplex (TDD)-uplink-downlink configuration (TDD-UL-DL-configuration) common information;
    identifying, by the processor, information regarding a DL-UL transmission period, a DL pattern indicating DL resources, a UL pattern indicating UL resources, and a sidelink (SL) pattern indicating SL resources, which are included in the TDD-UL-DL-configuration common information, the DL resources, the UL resources, and the SL resources being included in the DL-UL transmission period, and resources other than the DL resources, the UL resources, and the SL resources among all resources included in the DL-UL transmission period being flexible resources;

receiving, by the processor, from the base station a radio resource control (RRC) message including TDD-UL-DL-configuration dedicated information;

identifying, by the processor, from the TDD-UL-DL-configuration dedicated information a slot pattern that indicates resources used for SL communication among the flexible resources configured by the TDD-UL-DL-configuration common information; and performing, by the processor, DL communication, UL communication, or the SL communication using resources configured by the TDD-UL-DL-configuration common information and the TDD-UL-DL-configuration dedicated information, wherein one or more flexible resources among the flexible resources configured by the TDD-UL-DL-configuration common information are overwritten by the TDD-UL-DL-configuration dedicated information to be the resources used for the SL communication, and wherein the SL pattern includes information indicating a number of consecutive SL symbols located before a starting SL slot among consecutive SL slots in the DL-UL transmission period, information indicating a number of consecutive SL symbols located after an ending SL slot among the consecutive SL slots, an index of the starting SL slot, and an index of the ending SL slot.

6. The operation method according to claim 5, wherein the SL pattern includes information indicating a number of the consecutive SL slots.

7. The operation method according to claim 5, wherein the SL pattern is used to reconfigure one or more UL resources among the UL resources configured by the UL pattern to SL resources used for SL communication.

8. The operation method according to claim 5, wherein the slot pattern includes at least one of the group consisting of: a slot index, information indicating that all symbols included in a slot indicated by the slot index are SL symbols, information indicating a number of consecutive SL symbols among all the symbols included in the slot indicated by the slot index, an index of a starting SL symbol among the consecutive SL symbols, and an index of an ending SL symbol among the consecutive SL symbols.

9. The operation method according to claim 5, wherein the performing of the SL communication further comprises:

transmitting, by the processor, to a second UE a sidelink control information (SCI) including information that indicates the SL resources configured by the TDD-UL-DL-configuration common information and the TDD-UL-DL-configuration dedicated information; and performing the SL communication with the second UE by using the SL resources indicated by the SCI.

10. A first user equipment (UE) in a communication system, the first UE including a processor, a transceiver operated by the processor, and a memory configured to store at least one instruction executable by the processor, wherein when executed by the processor, the at least one instruction is configured to:

receive from a base station system information including time division duplex (TDD)-uplink-downlink configuration (TDD-UL-DL-configuration) common information; and identify information regarding a DL-UL transmission period, a DL pattern indicating DL resources, a UL pattern indicating UL resources, and a sidelink (SL) pattern indicating SL resources, which are included in the TDD-UL-DL-configuration common information, the DL resources, the UL resources, and the SL resources being included in the DL-UL transmission period, and resources other than the DL resources, the UL resources, and the SL resources among all resources included in the DL-UL transmission period being flexible resources;

receive a downlink control information (DCI) from the base station;

identify from the DCI a slot format indicator (SFI) that indicate resources used for SL communication among the flexible resources configured by the TDD-UL-DL-configuration common information; and perform DL communication, UL communication, or the SL communication by using resources configured by the TDD-UL-DL-configuration common information and the SFI, wherein one or more flexible resources among the flexible resources configured by the TDD-UL-DL-configuration common information are overwritten by the SFI to be the resources used for the SL communication, and wherein the SL pattern includes information indicating a number of consecutive SL symbols located before a starting SL slot among consecutive SL slots in the DL-UL transmission period, information indicating a number of consecutive SL symbols located after an ending SL slot among the consecutive SL slots, an index of the starting SL slots, and an index of the ending SL slot.

11. The first UE according to claim 10, wherein the SL pattern further includes information indicating a number of the consecutive SL slots.

12. The first UE according to claim 10, wherein the SL pattern is used to reconfigure one or more UL resources among the UL resources configured by the UL pattern to SL resources used for SL communication.

13. The first UE according to claim 10, wherein the at least one instruction is further configured to:

transmit to a second UE a sidelink control information (SCI) including information that indicates the SL resources configured by the TDD-UL-DL-configuration common information and the SFI; and perform the SL communication with the second UE by using the SL resources indicated by the SCI.

* * * * *